A. F. KNEEN.
FINE WIRE SPOOLING MACHINE.
APPLICATION FILED DEC. 2, 1919.

1,370,321.

Patented Mar. 1, 1921.
3 SHEETS—SHEET 1.

INVENTOR
Alfred F. Kneen
BY
ATTORNEY

A. F. KNEEN.
FINE WIRE SPOOLING MACHINE.
APPLICATION FILED DEC. 2, 1919.

1,370,321.

Patented Mar. 1, 1921.
3 SHEETS—SHEET 2.

INVENTOR
Alfred F. Kneen
BY
ATTORNEY

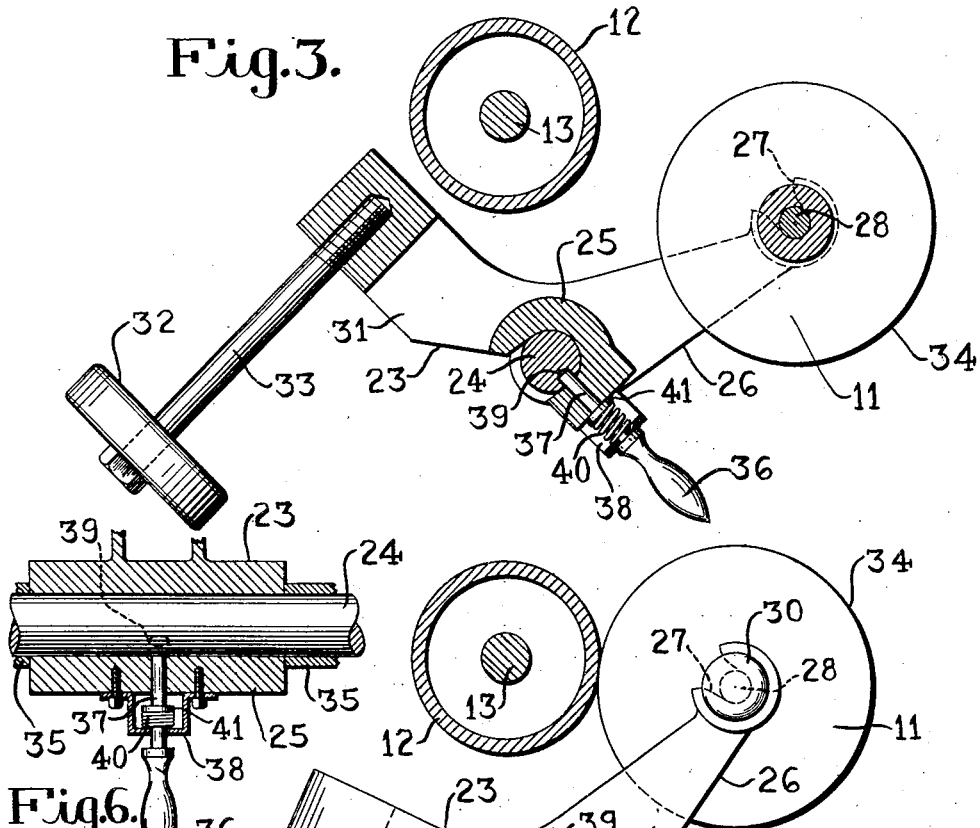
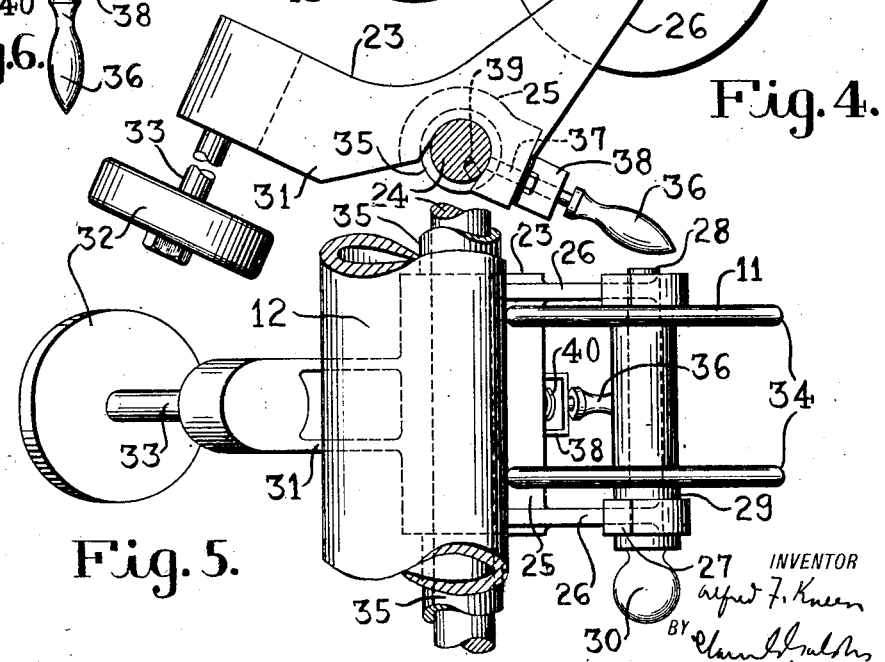

UNITED STATES PATENT OFFICE.

ALFRED F. KNEEN, OF HASTINGS-UPON-HUDSON, NEW YORK.

FINE-WIRE-SPOOLING MACHINE.

1,370,321.  Specification of Letters Patent.  Patented Mar. 1, 1921.

Application filed December 2, 1919. Serial No. 341,968.

*To all whom it may concern:*

Be it known that I, ALFRED F. KNEEN, a citizen of the United States, residing in the village of Hastings-upon-Hudson, county of Westchester, State of New York, have invented a new and useful Improvement in Fine-Wire-Spooling Machines, of which the following is a specification.

The invention relates to fine wire spooling machines, and has for its object to eliminate the usual positive belt drives, to reduce wire breakage and scrap, and to secure simplicity of upkeep and attention. To this end the line of spools is driven frictionally and directly by a common cylinder, from which the spools are individually separable by means of movable carriers. Weights hold the individual spool disks in driven contact with the cylinder, and handles and locks are provided for moving and holding them away.

In the accompanying drawings illustrating the preferred and simple embodiment of the invention:

Fig. 3 is a vertical transverse sectional elevation illustrating the idle condition of a spool;

Fig. 4 is a similar view, with all but the longitudinally extending parts in elevation, showing the driving condition, the weight stem being broken away and shortened for economy of space;

Fig. 5 is a fragmentary plan view, corresponding to Fig. 4; and

Fig. 6 is a fragmentary section through one of the spool rockers taken in a plane of the axis of the rocker and locking shaft, which is shown in elevation.

Figure 1:
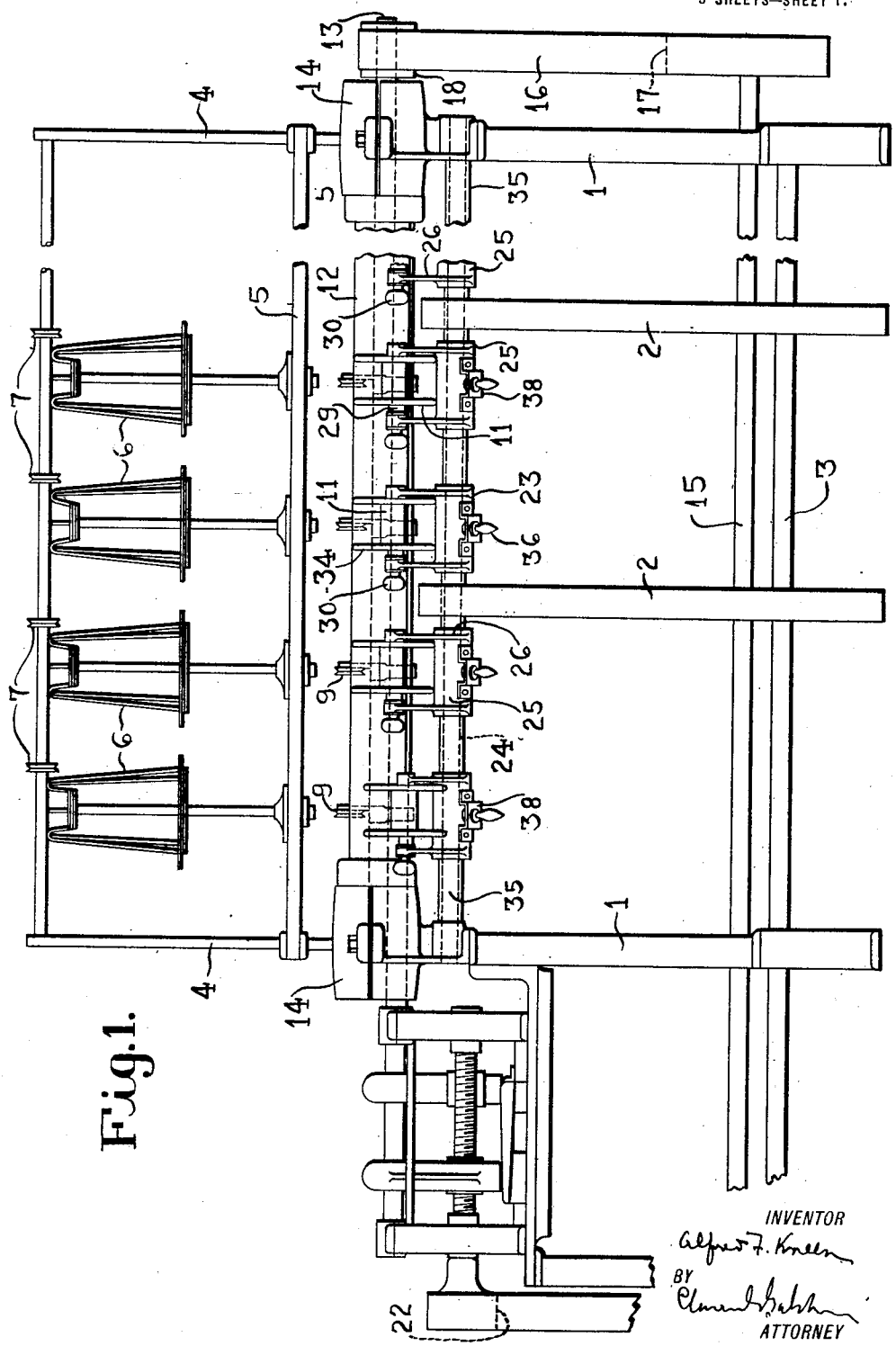
Figure 1 is a front elevation of the improved spooling machine, an interior part thereof being broken away to shorten the machine for purposes of illustration, and one of the spools being shown separated from the driving cylinder.

The frame of the machine comprises suitable end and intermediate uprights 1, 2, united by longitudinal members, some of which are indicated at 3.

At the back of the frame rises a stand 4, on a forwardly overhanging bracket 5 of which the coil holders 6 are mounted. The wire from these coils passes over guide rollers 7 on the top of the stand, and thence downward under and over traverse guide rollers 8, 9 on a traverse bar 10 slidable on the frame behind the spools 11, the rollers 9 being supported in rearwardly overhanging relation to the drive cylinder 12.

Said cylinder extends the length of the machine, which comprises a long series of spools and appurtenant parts, and drives all the spools, any one or more of which, however, can instantly be thrown to idle position. The cylinder is rotatably supported and driven in a suitable manner, as by being united to a central shaft 13 journaled in bearings 14. Mounted in this way, the outer cylinder or drum can, of course, be interrupted at one or more points, as to admit of an intermediate bearing, which is not shown because of the limits of space available. The cylinder is shown driven from a bottom drive shaft 15 by a belt 16 passing around a pulley 17 on one end of said shaft and a pulley 18 on the corresponding end of the shaft 13.

The spools 11 are carried by individual frames or rockers 23, tiltably mounted on a longitudinal rod 24 supported in the members of the frame, below the drive cylinder and slightly forward of the vertical plane of its axis. Each of said rockers comprises a saddle or open bearing hub 25 rotatably resting on the pivot rod, and capable of being lifted off, while held thereon under conditions of operation. From the saddle side arms 26 project forward and upward with sufficient space between them to accommodate the spool. The ends of said arms have slotted notches 27 opening upwardly and rearwardly toward the cylinder 12 to receive the projecting end portions of the shaft 28 of the spool. One of said ends bears a collar 29 and a handle knob 30, the arm being embraced between said collar and the end of the spool, whereby the latter is held in proper longitudinal relation.

From the saddle 25 of each spool rocker, another arm, or pair of arms, 31 extends rearward and upward to carry a weight 32, on a rearwardly and downwardly extending stem 33 screwed into the arm. This weight, for which under certain circumstances might be substituted a spring, serves to press the flanges 34 of the spool against the cylinder with sufficient force to insure driving contact for the purpose of drawing off and winding up the wire, while if trouble should arise, materially increasing the resistance upon any one of the spools, that spool will slip upon the common cylinder, thereby avoiding breakage and loss of time and material. Furthermore, at any time any one or more of the spools can be thrown out of action, by tilting the corresponding rocker or rockers so as to swing the spool or spools downward and forward away from the cylinder, thereby raising the weights of such spools, which will restore them to driving position as soon as permitted.

Spacer sleeves 35 on the rod 24 between the saddle hubs 25 hold the rockers and spools at proper distances and positions lengthwise of the machine.

For tilting the spool rockers and locking them out, forwardly and downwardly projecting handles 36 are preferably provided on the saddle hubs 25, said handles having stems 37 which slide in holes in said hubs and in yokes 38 secured thereto. The inner ends of said stems press against the side of the pivot rod 24 and drop into recesses 39 therein when the rockers are turned to the idle position. For this purpose the stems are pressed rearward by springs 40 confined between the yokes 38 and collars 41 on the stems.

Figure 2:
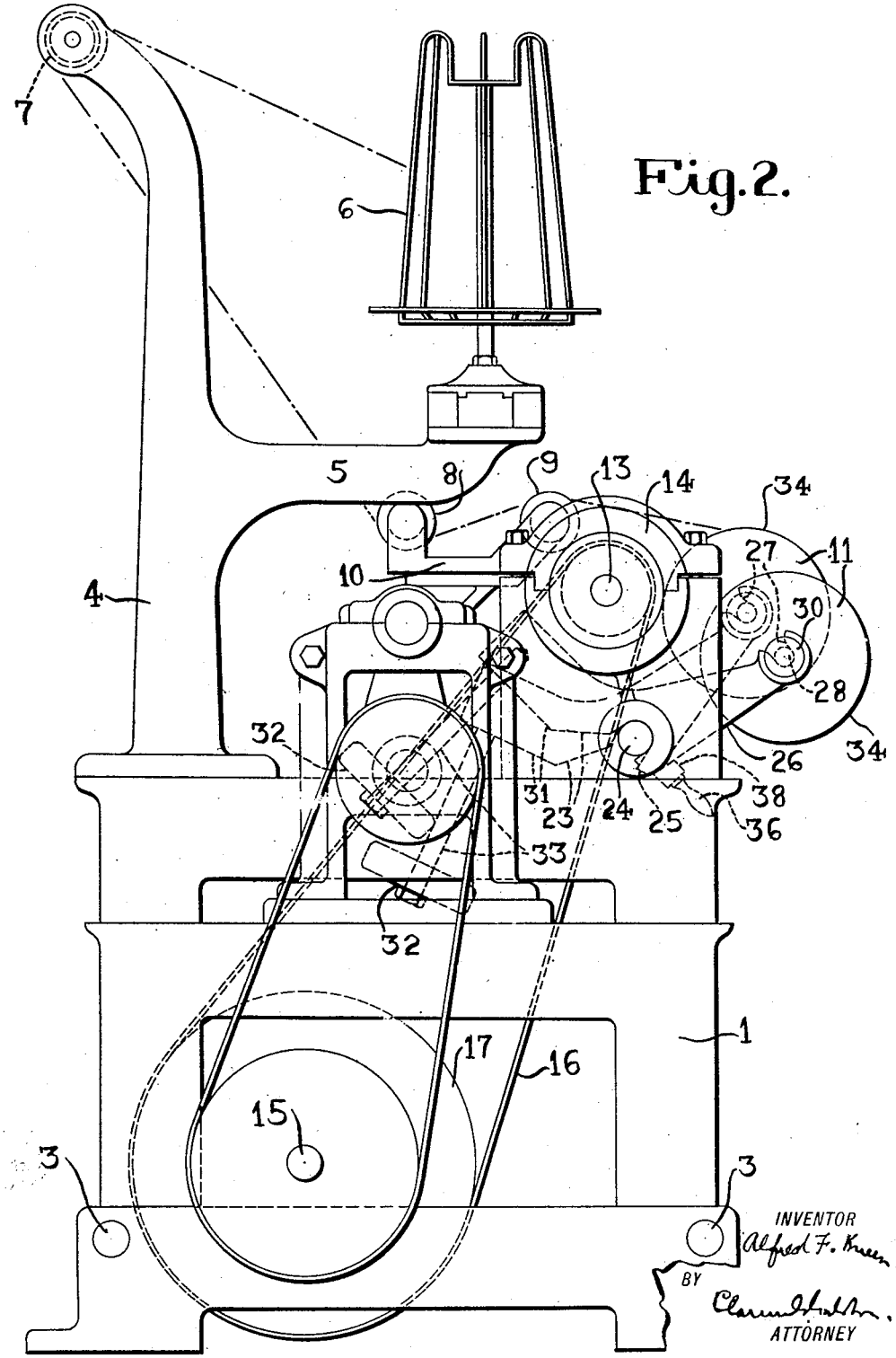
Fig. 2 is an end elevation, showing one of the spools moved out as in Fig. 1.

The operation will be readily understood. As long as the spool flanges are in contact with the common cylinder and normal resistance is encountered, they are driven in a substantially positive manner, drawing off and winding up the wire, which is laid by means of the traverse mechanism. If the resistance at any of the spools should increase beyond the degree at which the weights produce full traction, the flanges will slip, thus reducing the speed of winding or stopping it altogther, and thereby automatically safeguarding against breakage and waste in connection with such spool or spools, without affecting the others. In case of difficulty at any one of the spools, or when removing a full spool and inserting an empty one, the corresponding handle 36 is grasped and pressed downward, thus tilting the rocker and spool to the idle position shown in Fig. 3 and at the end of the machine in Figs. 1 and 2. When the locking stem 37 comes opposite its notch 39 in the rod 24, it snaps in and the spool and rocker are held out against the action of the weight tending to restore them. Restoration is accomplished by simply pulling out on the handle and permitting the weight to carry the spool flanges against the cylinder.

While the preferred embodiment of the invention has been described in detail, it will be understood that numerous changes in form, proportions and arrangements may be made without departing from essentials. While the spools are preferably driven in the opposite direction to the cylinder by direct frictional engagement of their flanges therewith, it will be understood that this can be varied with somewhat less simplicity so as to cause them to turn in the same direction. The flanges constitute embodiments of friction wheels for driving the spools movable into and out of peripheral driving engagement, where they are held with capacity for slipping by the action of the weights.

What is claimed as new is:

1. In a wire spooler, the combination of a frame, a longitudinal driving cylinder therein, a pivot rod parallel with the cylinder, a series of spool rockers having saddles resting removably on said rod, forward spool-carrying arms, and rearward arms having weights attached thereto, and means whereby the spools carried by the rockers are driven by frictional engagement with the cylinder.

2. In a wire spooler, the combination of a frame, a longitudinal driving cylinder, a pivot rod having a series of locking notches, a series of spool rockers pivoted on the rod, pull-out handles on the rockers, stems connected with the handles to coöperate with said notches, and springs for pressing the stems in.

3. A wire spooler, comprising a frame, a longitudinal driving cylinder therein, a pivot rod parallel with and below the cylinder, a series of spool rockers individually tiltable on said rod and comprising spool-carrying arms projecting upward in front of the cylinder and weight arms extending rearward beneath the cylinder, and spools in said spool-carrying arms having flanges to bear frictionally against the forward part of the cylinder.

4. A wire spooler comprising a frame, a longitudinal driving cylinder therein, a pivot support parallel with and below the cylinder, a series of spool rockers individually tiltable on said pivot support and having arms projecting upward in front of the cylinder and carrying spools having flanges to bear frictionally against the forward part of the cylinder, and means acting upon the rockers for pressing the spools yieldingly against the cylinder.

5. A wire spooler comprising a frame, a longitudinal driving cylinder therein, a pivot support parallel with and below the cylinder, a series of spool rockers individually tiltable on said pivot support and having arms projecting upward in front of the cylinder and carrying spools having flanges to bear frictionally against the forward part of the cylinder, means acting upon the rockers for pressing the spools yieldingly against the cylinder, handles on the several rockers for rocking them forward away from the cylinder, and individual locks for holding them in such position.

ALFRED F. KNEEN.

Witness:
CHAS. C. DE LANOY.